United States Patent [19]

Rodgers, Jr.

[11] E Re. 31,224

[45] Reissued May 3, 1983

[54] METAL-PLASTIC COMPOSITE RACQUET

[75] Inventor: Robert E. Rodgers, Jr., Houston, Tex.

[73] Assignee: Leach Industries, Inc., San Diego, Calif.

[21] Appl. No.: 87,034

[22] Filed: Oct. 22, 1979

Related U.S. Patent Documents

Reissue of:

[64] Patent No.: 4,066,260
Issued: Jan. 3, 1978
Appl. No.: 732,656
Filed: Oct. 15, 1976

[51] Int. Cl.[3] ..... A63B 49/10

[52] U.S. Cl. ..... 273/73 C; 273/73 H; 273/73 J

[58] Field of Search ..... 273/73 R, 73 C, 73 D, 273/73 F, 73 G, 73 H, 73 K

[56] References Cited

U.S. PATENT DOCUMENTS

| | | | |
|---|---|---|---|
| 1,676,051 | 7/1928 | Robinson | 273/73 C |
| 1,937,787 | 12/1933 | Robinson | 273/73 H |
| 2,171,223 | 8/1939 | Robinson | 273/73 D |
| 2,552,020 | 5/1951 | Tribelhorn | 273/73 F |
| 2,742,289 | 4/1956 | Allward | 273/73 H |
| 3,431,626 | 3/1969 | Carlton | 273/73 H X |
| 3,568,290 | 3/1971 | Carlton | 273/73 H |
| 3,612,526 | 10/1971 | Brull | 273/73 C |
| 3,625,512 | 12/1971 | Latham et al. | 273/73 C |
| 3,642,283 | 2/1972 | Wilkens | 273/73 C X |
| 3,664,668 | 5/1972 | Held | 273/73 D X |
| 3,702,701 | 11/1972 | Vaughn et al. | 273/73 H |
| 3,805,366 | 4/1974 | Vaughn et al. | 273/73 H X |
| 3,814,423 | 6/1974 | Shockley et al. | 273/73 C |
| 3,899,172 | 8/1975 | Vaughn et al. | 273/73 C |
| 3,930,648 | 1/1976 | Brown | 273/73 D |
| 3,949,988 | 4/1976 | Staufer | 273/73 K X |
| 3,986,716 | 10/1976 | Taussig et al. | 273/73 C |
| 3,990,701 | 11/1976 | Kim | 273/73 C |
| 4,119,313 | 10/1978 | Popplewell et al. | 273/73 C X |
| 4,182,512 | 1/1980 | Kuebler | 273/73 C |

FOREIGN PATENT DOCUMENTS

| | | | |
|---|---|---|---|
| 122823 | 11/1946 | Australia | 273/73 H |
| 238250 | 4/1962 | Australia | 273/73 C |
| 282952 | 3/1967 | Australia | 273/73 C |
| 2333610 | 1/1975 | Fed. Rep. of Germany | 273/73 D |
| 2307444 | 4/1976 | France | 273/73 D |
| 1126438 | 9/1968 | United Kingdom | 273/73 C |

*Primary Examiner*—Richard J. Apley
*Attorney, Agent, or Firm*—LeBlanc, Nolan, Shur & Nies

[57] ABSTRACT

A game racquet comprising a composite metal and plastic frame having a stringing section and a handle, the composite frame formed from an extruded metal channel member surrounding and substantially enclosing an extruded plastic core member, the extruded metal and plastic core member being bonded together to form a unitary metal-plastic composite frame, *wherein the horizontal neutral axis of the core member is closely aligned with the horizontal neutral axis of the metal channel member* and a bumper strip covering the outer surface of the composite frame, the bumper strip having a central groove to receive and protect the stringing.

19 Claims, 7 Drawing Figures

METAL-PLASTIC COMPOSITE RACQUET

Matter enclosed in heavy brackets [ ] appears in the original patent but forms no part of this reissue specification; matter printed in italics indicates the additions made by reissue.

BACKGROUND OF THE INVENTION

This invention relates to a new and unique game racquet for use in playing racquetball, squash or similar games in which a composite extruded metal and plastic frame is employed to secure a racquet having the desired balance and flexibility for better ball control but with sufficient durability to withstand extensive use in either recreational or tournament play without objectional deformation.

Laminated wood and extruded metal frames of aluminum, aluminum alloys, and stainless steel, have been previously used in the manufacture of racquets but such frames all have limitations which resist universal acceptance, and extensive experimentation has been conducted in an effort to secure a racquet incorporating all the desired characteristics of previously designed frames without increasing the cost of manufacture over the procedures customarily employed.

In view of inherent strength, a tubular or channel steel frame structure provides a logical choice for racquets of the type in question but have been found to be objectionable because of excessive flexibility or excessive weight. Extruded frames of aluminum or aluminum alloys possess the desired rigidity, but as noted in the prior art, such as the patent to Vaughan et al., U.S. Pat. No. 3,899,172, of Aug. 12, 1975, such frames have a tendency to deform in use. However, bending strength is not the characteristic that determines durability. The ability of the frame to absorb energy without yielding is the important characteristic because the racquet does not transmit a force to the ball, but rather it transmits energy that has been developed by the player's arm and stored in the racquet. My composite frame has excellent energy storage capacity as compared with conventional tubular aluminum frames.

Extruded metal frames also have been found to be objectional in that string wear may be excessive at the point of contact between the strings and the metal edges of the stringing holes. The strings are subject to excessive wear resulting from the friction as the ball strikes the strings, causing the strings to fail at that point.

Modifying the cross-section design of the metal frame in an effort to overcome this objection presents a problem. Increasing the thickness of the web of the metal frame member without increasing the weight, reduces the strength of the frame and increases the tendency to breakage. Present designs represent a compromise between springing action and durability, dictated in part at least, by costs of manufacture.

SUMMARY OF THE INVENTION

A primary object of the present invention is to provide a game racquet incorporating as far as possible all the desired features of previous designs but eliminating the characteristics which have been found to be objectional.

I have found that my novel construction and design of a game racquet in which the frame comprises a composite extruded metal channel member substantially encasing an extruded plastic core, the plastic extruded core being affixed or bonded to the metal channel member by means of a suitable adhesive, results in a composite metal-plastic frame of improved strength and durability but incorporating the desired degree of flexibility. In addition, a soft plastic suspension is provided for the strings and the necessity for grommets or rivets is eliminated.

The advantages of my new design will be apparent to those skilled in the art from the following description.

DETAILED DESCRIPTION

Figure 1:
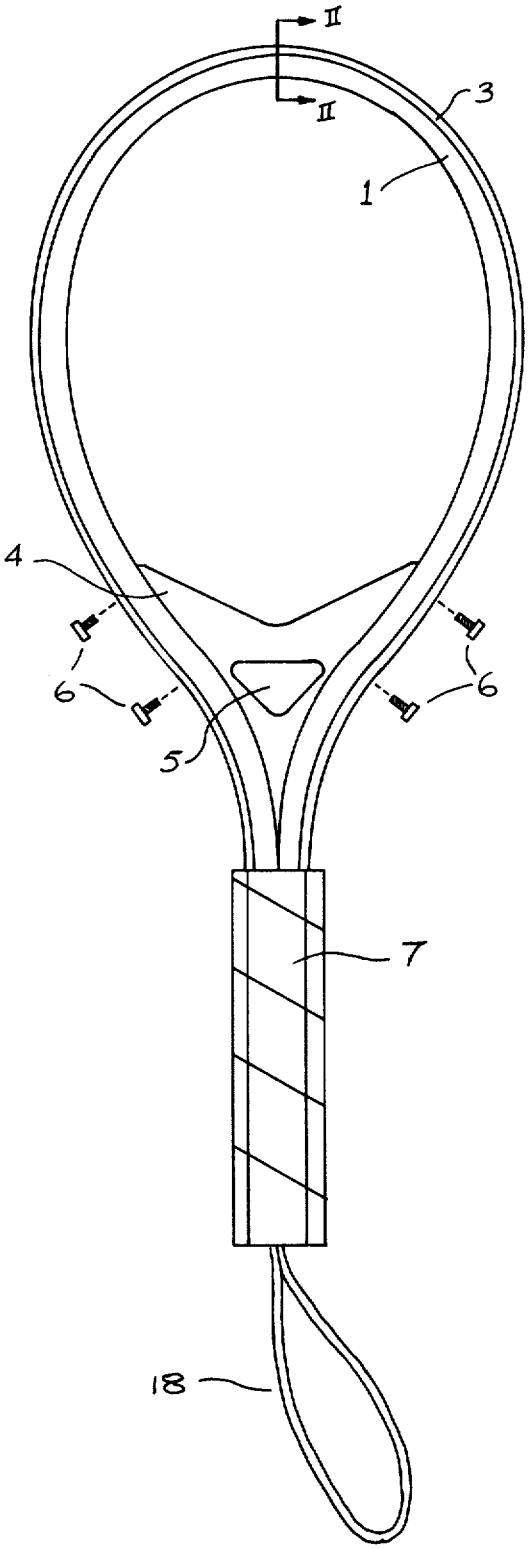
FIG. 1 is a top plan view of the racquet made in accordance with the present invention.
Figure 2:
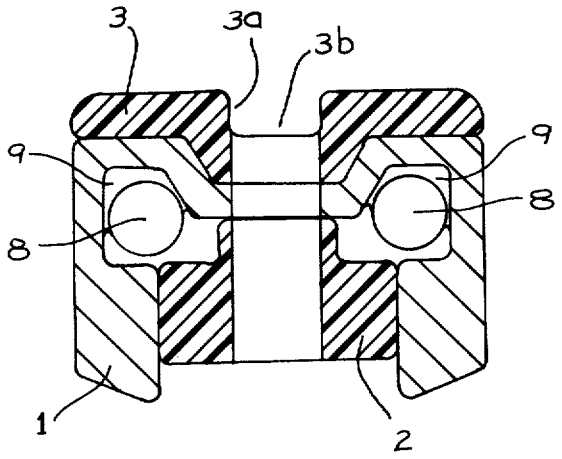
FIG. 2 is a cross sectional view taken along lines II—II, of FIG. 1.

Referring to FIG. 1, the game racquet described herein, comprises a composite frame, including an extruded metal channel member 1, such as aluminum, substantially surrounding and encasing an extruded plastic core 2, as shown in FIG. 2, formed into a generally oval shape to define a stringing surface, a plastic bumper strip 3, having a channel 3a, to protect the stringing, and a throat piece 4, secured to the metal channel member 1, by means of screws 6, to reinforce and impart rigidity to the composite frame. The throat piece 4, may be solid or, if desired, may have an opening 5, therein of any desired configuration, but of limited size, so as not to materially weaken the same.

The metal frame member, a cross-section of which is shown in FIG. 2, is a custom extrusion in the shape of an "inverted U", designed to provide the proper bending moment of inertia in the x and y axes, while having the proper weight per length of frame and the proper height and width for reasonable appearance of the finished article.

The plastic core 2, is also a custom extrusion having the shape of an "inverted T," which fits within and is affixed to the metal channel member 1, forming a composite bonded metal-plastic frame. The plastic core member serves to reinforce and impart a certain degree of rigidity to the metal channel member.

The plastic core member 2, and plastic bumper strip 3, are preferably of ABS, although any extrudable plastic with similar rigidity and high impact strength, such as nylon, rigid PVC, or polycarbonate, is acceptable.

If it is desired to weight the head of the racquet to affect balance, weight and feel, small diameter lengths of a dense material, such as lead 8, as shown in FIG. 2, may be bonded to the metal section of the frame with a flexible adhesive, such as epoxy, although any adhesive with reasonable flexibility and bond strength between the metal frame and the weighting material may be used. This feature of the frame design is of significant advantage since the amount of weight necessary to achieve desired balance may be readily varied and the weight is totally obscured in the completed racquet.

In the manufacture of my racquet, the metal channel extrusion 1, and the plastic core extrusion 2, are cut to length and the plastic extrusion bonded into the metal channel member with an adhesive, such as epoxy, and the adhesive allowed to cure to form a composite metal-plastic frame. While epoxy is normally used as the bonding agent, any adhesive with the requisite flexibility and bonding strength between the metal channel member and the plastic core, may be used.

The length of composite frame is then formed around a mandrel to generate the proper racquet frame shape. The plastic bumper extrusion 3, is bonded to the formed composite frame with an adhesive, such as epoxy, or any adhesive of comparable flexibility and bond strength. The plastic bumper strip 3, cannot be bonded before forming the frame because the horizontal neutral axis of the plastic bumper extrusion is displaced considerably from the horizontal neutral axis of the metal extrusion and the adhesive bond between the two would be placed under an excessively high sheer loading when forming the composite frame.

Holes are then drilled into the slot of the plastic bumper strip 3, indicated at 3b, FIG. 2, through the formed composite frame to accomodate racquet stringing. Additionally, screw holes are provided in the throat area of the formed composite frame to receive the screws 6, to allow attachment of the throat piece 4.

The throat piece may be of molded plastic and can be formed from epoxy, fiber glass reinforced epoxy, nylon, fiber glass reinforced nylon, polycarbonate, or any other plastic or fiber glass reinforced plastic having at least moderate rigidity and high impact tensile strength. The throat piece has holes drilled or molded in place that coincide with holes in the formed composite frame to accommodate stringing and receive the screws 6. The strength of attachment of the throat piece to the frame can be improved by applying an adhesive between the throat piece and the composite frame before inserting the screws, as described above.

Figure 3:
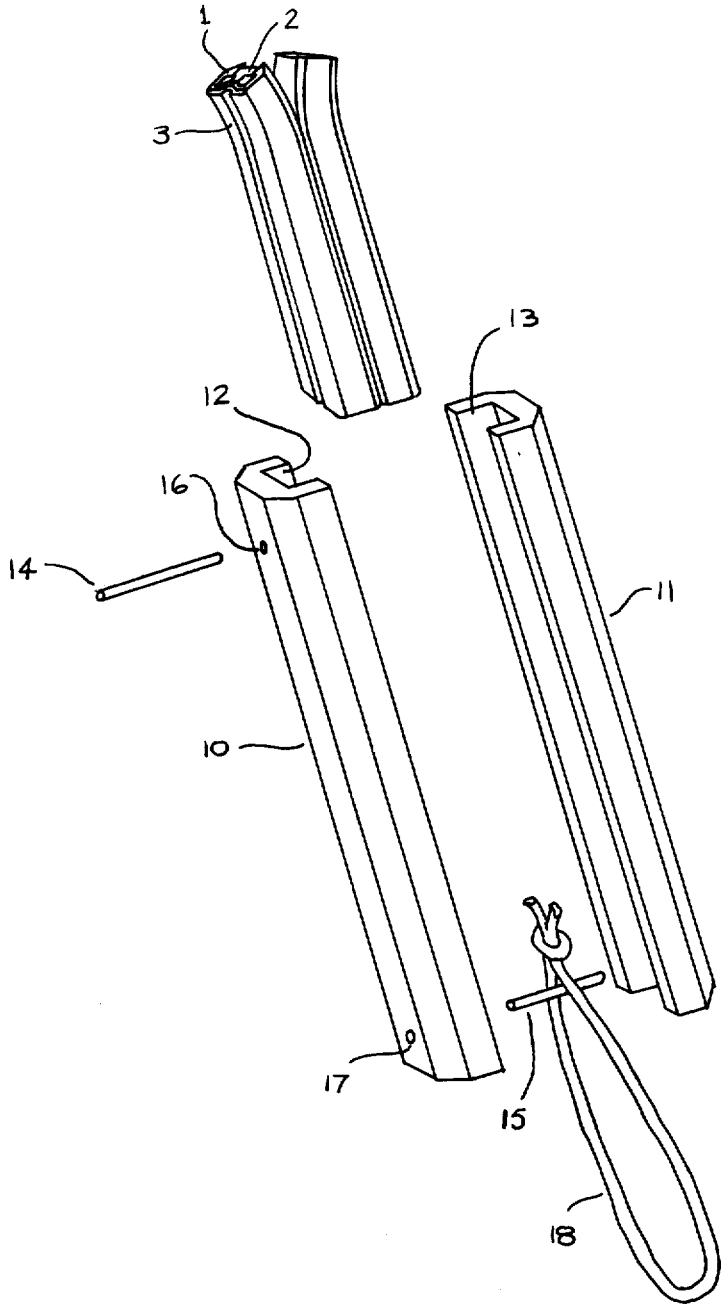
FIG. 3 is an exploded view, in prospective, showing construction details and the manner in which the composite frame is assembled and attached to the handle.
Figure 4:
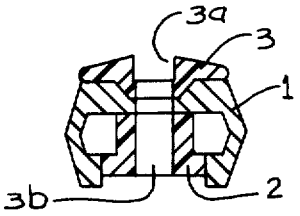
FIGS. 4, 5, 6 and 7, are cross sectional views of modifications of the metal and plastic extrusions which may be used in fabricating the frame member of the racquet in accordance with the present invention.
Figure 5:
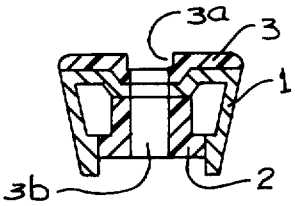
Figure 6:
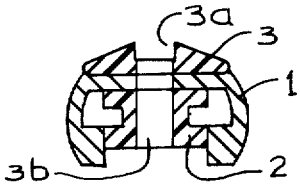
Figure 7:
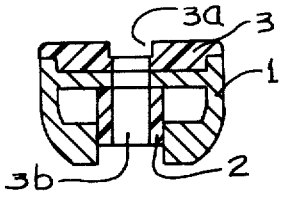

The handle for the racquet can be formed in several ways. As shown in FIG. 3, two corresponding shaped wooden members, 10 and 11, having "U-Shaped" channel sections, 12, and 13, respectively, adapted to receive the lower end of the composite frame, are adhesively bonded together and allowed to cure. Pins 14, and 15, pass through holes 16, and 17, in handle member 10. Before securing the two handle sections together, a thong 18, is looped over the pin 15, to provide a convenient means to hang the racquet when it is not in use. The composite frame is then inserted in the handle and adhesively bonded thereto with epoxy or comparable adhesive. Before inserting the lower portion of the composite frame into the handle, the frame is drilled to receive the pin 14. While only one pin has been shown in the drawing for this purpose, additional pins to secure more rigid attachment may be used, if desired. A leather grip may then be wrapped around the handle and the racquet strung with nylon string.

In addition to the construction shown in FIG. 3, the handle can be molded in a lightweight foamed plastic for reduced costs in large quantities.

The metallic frame with the plastic "Inverted T" extrusion bonded in place results in a composite frame having unique structural properties that the metal and plastic extrusions by themselves do not possess. The bending rigidity of the composite frame is somewhat higher than that of the metal extrusion while the torsional rigidity of the composite frame is higher than that of the aluminum extrusion. Additionally, the composite is more stable during forming and can be bent to small radius curves (less than 5 times cross section height) without visible distortion. However, the metal extrusion distorts drastically when formed to such curves. An important feature of my frame design that makes forming more practical is that the horizontal neutral axis of the plastic "Inverted T" extrusion is closely aligned with the horizontal neutral axis of the metal extrusion. This reduces the shear loading in the adhesive bond between the plastic extrusion and the metal extrusion to a minimum.

Tests with my new racquet design show that is has many desirable features. The composite frame is highly flexible which allows the ball to remain on the strings for a greater length of time, producing better ball control for the player. Currently marketed fiberglass racquets have this same feature but are not very durable. The herein described racquet is very durable and has outlasted one of the more durable metal frame racquets in laboratory tests.

Material and labor costs per racquet for the herein described design are comparable to currently marketed metal frame racquets while tooling costs for my racquet are significantly lower than for fiberglass racquets.

The cross sectional shapes for both the metal and plastic extrusions may be varied, a few examples being shown in FIGS. 4, 5, 6 and 7. These modifications, however, all have the same basic structure in that an extruded metal channel member substantially surrounds and is bonded to an extruded plastic core to form a unitary composite frame. In each instance, as shown in these Figures, and also in FIG. 2, the shape of the plastic extrusion is such as to leave a channel *9* between the metal and plastic within which small diameter lengths *8* of a weighting material, such as lead, may be inserted to provide the desired balance and feel, as explained in connection with the description of FIG. 2.

In the form shown in FIGS. [5] *4*, and [6] *5*, as well as in FIG. 2, the plastic extrusion is in the form of an "Inverted T," in FIG. [7] *6*, the extrusion is in the form of an "H", while FIG. [8] *7* reveals a modification in which a rectangular or substantially square extrusion is employed.

The plastic bumper strip extrusion, likewise, may take a number of different forms, as illustrated in FIG. 2, and FIGS. 5 through 7. In each instance, however, the strip is provided on its exposed edge with a central channel 3a, within which the strings are recessed and protected from wear and abrasion.

The plastic bumper strip also serves several other purposes since it reduces the shock transmitted to the racquet frame when struck against a floor or wall. Since the bumper strip is a structural part of the racquet it increases the bending and torsional stiffness and strength of the frame and acts as a smooth surface for the strings without the addition of metal or plastic grommets.

The racquet constructed in accordance with the above description is attractive, sturdy, and because of the simple cross sections of the extrusions and lack of large molded sections, only inexpensive tooling is required for production.

This invention has been described with reference to the preferred embodiments thereof but it will be understood that variations and changes, obvious to those skilled in the art, may be made within the spirit and scope of the appended claims.

I claim:

1. In a game racquet;

a composite metal and plastic frame defining a stringing section and a handle;

the composite frame comprising a unitary substantially rectangular extruded metal channel member having in cross-section, an "M" configuration, the outer side walls of which are substantially parallel, said metal channel member having a closed top outer section and a partially closed bottom inner section, the lower edges of the side walls of the metal channel member having an integral continuous reinforcing and thickening rib along the inner surfaces thereof partially closing said bottom section of the metal channel member and imparting rigidity to the composite frame;

an extruded plastic core member mounted within and bonded to the lower inside surface and the inner surface of the side wall reinforcing ribs of the metal channel member to form a unitary frame, the outer surface of the plastic core being substantially encased by the metal channel member and so dimensioned as to leave a space between the side walls of the metal channel member and the plastic core for the reception of a weighting material;

a reinforcing throat piece attached to and imparting rigidity to the frame; and a plastic bumper strip covering the outer surface of the metallic frame member, stringing holes passing through the bumper strip and the composite frame, the plastic bumper strip having a central groove to receive and protect the stringing from abrasion.

2. A game racquet as defined in claim 1, in which the upper surface of the extruded metal channel member is provided with a central groove, the plastic bumper strip being partially recessed in said groove.

3. A game racquet as defined in claim 1, in which the extruded plastic core member is in the form of an "Inverted T".

4. A game racquet as defined in claim 1, in which the extruded plastic core member is in the form of an "H".

5. A game racquet as defined in claim 1, in which the extruded plastic core member is bonded to the extruded metal channel member by means of an adhesive.

6. A game racquet as defined in claim 1, in which the extruded plastic core member is affixed to the extruded metal channel member with an epoxy adhesive.

7. A game racquet as defined in claim 1, in which a weighting material of lead is inserted in the channel between the extruded metal channel member and the extruded plastic core.

*8. In a game racquet, a composite metal and plastic frame formed intermediate its ends into a head defining a stringing section and having its opposite ends adjacently side by side for defining a handle section, said frame comprising a preformed metal strip, a solid preformed synthetic plastic core member, and an outer preformed strip of synthetic plastic, said core member and said metal strip being substantially coextensive in length, said metal strip being of generally U-shape in cross section to define an inwardly open channel having an outer wall and inwardly extending side walls, the lower edges of said side walls each having an integral continuous reinforcing and thickening rib along the inner surfaces thereof partially closing the channel and imparting rigidity to the composite frame, said core member being disposed wholly within said channel and extending between and being surface bonded directly to the inner sides of said ribs and said outer strip being surface bonded directly upon the outer side of said outer wall, said outer plastic strip extending laterally to protectively cover the outer surface of said channel outer wall and extending longitudinally around the end of said stringing section opposite the handle section, whereby said bonded strips mutually contribute to provide a laminated structure of increased rigidity and energy absorbing characteristics, and means providing in the stringing section a series of aligned stringing holes extending through said core member and said strips.*

*9. In the game racquet defined in claim 8, a throat element of moderately rigid synthetic plastic mounted on the frame to define the inner end of said stringing section.*

*10. In the game racquet defined in claim 8, there being a continuous narrow external groove in said outer wall of the channel and said outer plastic strip being so constructed and arranged as to fill said groove and extend over the adjacent outer surfaces of said outer wall.*

*11. In the game racquet defined in claim 10, said outer plastic strip being formed with an external groove adapted to receive and protect stringing in said stringing section.*

*12. In the game racquet defined in claim 8, said core member being an extruded plastic strip of uniform cross section, and said outer strip being an extruded plastic strip.*

*13. In a game racquet, a composite metal and plastic frame defining a stringing section and a handle, the composite frame comprising a unitary substantially rectangular extruded metal channel member, said metal channel member opening inwardly and having a bottom wall and inwardly extending side walls, integral continuous thickening and reinforcing ribs extending along the inner ends of said side walls partially closing said channel and imparting rigidity to the composite frame, a solid plastic core member of substantially the same length as said channel substantially wholly mounted within and surface bonded to the inner surfaces of the side wall reinforcing ribs of the metal channel member, and a continuous plastic bumper strip bonded upon the outer surface of the channel bottom over at least the end of said stringing section opposite said handle, whereby said bonded channel member, core member and bumper strip mutually contribute to provide a laminated structure of increased rigidity and energy absorbing characteristics there being aligned stringing holes passing through the strips and the channel bottom, and the plastic bumper strip having its stringing holes opening into a central outwardly open groove to receive and protect the stringing from abrasion.*

*14. A game racquet defined in claim 13, in which the extruded core member is in the form of an "Inverted T".*

*15. In a game racquet, a composite metal and plastic frame formed intermediate its ends into a head defining a stringing section and having its opposite ends adjacently side by side for defining a handle section, said frame comprising an extruded metal strip and a preformed substantially coextensive synthetic plastic core member, said metal strip being of a cross section to define a channel having a bottom wall and side walls, the lower edges of said side walls each having an integral continuous reinforcing and thickening rib along the inner surfaces thereof partially closing the channel and imparting rigidity to the composite frame, said core member being disposed substantially within said channel and extending between and being adhesively bonded directly to inner surfaces of said ribs, said core member being bonded to said metal strip prior to forming the composite metal-plastic to define said stringing section, and the horizontal neutral axis of said plastic core member being closely aligned with the horizontal neutral axis of said metal strip to minimize shear loading in the*

*adhesive bond between the plastic core member and the metal strip, whereby said metal channel and plastic core member mutually contribute to provide a laminated frame structure of increased rigidity and energy absorbing characteristics, and means providing in the stringing section a series of aligned stringing holes extending through said core member and said metal strip.*

*16. In a game racquet, a composite metal and plastic frame formed intermediate its ends into a head defining a stringing section and having its opposite ends adjacently side by side for defining a handle section, said frame comprising an extruded metal strip and a preformed substantially coextensive synthetic plastic core member, said metal strip being of a cross section to define a channel having a bottom wall and side walls, said core member being disposed substantially within said channel and extending between and being adhesively bonded directly to the inner sides of said side walls and to the inner side of said bottom wall and said core member being of such shape as to define a closed channel between the plastic core member and said metal strip, a bumper strip of synthetic plastic material protectively overlying the outer surface of said channel bottom wall and extending around the end of the stringing section opposite the handle section, and means providing in the stringing section a series of aligned stringing holes extending through said core member, said bumper strip and said metal strip.*

*17. In a game racquet, a composite metal and plastic frame formed intermediate its ends into a head defining a stringing section and having its opposite ends adjacently side by side for defining a handle section, said frame comprising an extruded metal strip and a preformed substantially coextensive synthetic plastic core member, said metal strip being of a cross section to define a channel having a bottom wall and side walls, the lower edges of said side walls each having an integral continuous reinforcing and thickening rib along the inner surfaces thereof partially closing the channel and imparting rigidity to the composite frame, said core member being disposed substantially within said channel and extending between and being adhesively bonded directly to the inner sides of said ribs whereby to close the channel and provide a laminated structure of increased rigidity and energy absorbing characteristics, a bumper strip of synthetic plastic material protectively overlying the outer surface of said channel bottom wall and extending around the end of the stringing section opposite the handle section, and means providing in the stringing section a series of aligned stringing holes extending through said core member said bumper strip and said metal strip.*

*18. In the game racquet defined in claim 17, said core member being solid and of inverted T-shape with the stem of the T extending toward said bottom wall.*

*19. In a game racquet, a composite metal and plastic frame formed intermediate its ends into a head defining a stringing section and having its opposite ends adjacently side by side for defining a handle section, said frame comprising a preformed metal strip and a solid preformed substantially coextensive synthetic plastic core member, said metal strip being of a cross section to define a channel having a bottom wall and side walls, the lower edges of said side walls each having an integral continuous reinforcing and thickening rib along the inner surfaces thereof partially closing the channel and imparting rigidity to the composite frame, said core member being disposed substantially within said channel and extending between and being surface bonded directly to the inner sides of said ribs to define a closed channel, a bumper strip of solid synthetic plastic material protectively overlying and bonded upon the outer surface of said channel bottom wall and extending around the end of the stringing section opposite the handle section, whereby said bonded core member and strips mutually contribute to provide a laminated structure of increased rigidity and energy absorption characteristics and means providing in the stringing section a series of aligned stringing holes extending through said core member, said bumper strip and said metal strip.*

* * * * *